United States Patent [19]

Evans

[11] Patent Number: 4,985,699

[45] Date of Patent: Jan. 15, 1991

[54] FREE STAND WITH PROGRAMMABLE MUSIC PROGRAM PLAYING MEANS

[76] Inventor: Albert D. Evans, 18456 Middle Delaware, Henderson, Ky. 42420

[21] Appl. No.: 399,966

[22] Filed: Aug. 29, 1989

[51] Int. Cl.[5] ...................... G05B 19/00; G11B 31/00; A47G 33/12

[52] U.S. Cl. ............................... 340/825.240; 84/600; 369/20; 47/40.5

[58] Field of Search ................. 340/825.24; 84/464 R, 84/464 A, 600, 609, 610, 611, 612, 613, 614; 369/19, 20, 22, 31, 64, 69, 70; 47/41.11, 40.5, 42; 248/522, 526, 527

[56] References Cited

U.S. PATENT DOCUMENTS

| | | | |
|---|---|---|---|
| Re. 30,416 | 10/1980 | Yasunaga | 369/30 |
| 2,587,788 | 3/1952 | Tacy | 47/40.5 |
| 2,825,255 | 3/1958 | Kuehni et al. | 248/522 |
| 2,847,175 | 8/1958 | Farley et al. | 47/40.5 |
| 4,022,080 | 5/1977 | Bachmann | 369/24 |
| 4,250,787 | 2/1981 | Segan et al. | 84/609 |
| 4,862,438 | 8/1989 | Fry | 369/63 |

*Primary Examiner*—Donald J. Yusko
*Assistant Examiner*—Peter Weissman
*Attorney, Agent, or Firm*—H. Jay Spiegel

[57] ABSTRACT

A tree stand includes programmable circuitry allowing various messages to be played and lights to be illuminated responsive to actuation of various switches. The various switches are placed on the floor surface adjacent the tree stand and presents are placed over the various switches. Each switch is connected to a programmable control device designed to play a particular message responsive to activation of the switch. The message is designed to be specifically created for the recipient of the present which has been placed on the particular switch which has been activated.

7 Claims, 1 Drawing Sheet

FREE STAND WITH PROGRAMMABLE MUSIC PROGRAM PLAYING MEANS

BACKGROUND OF THE INVENTION

The present invention relates to a programmable tree stand. In the prior art, tree stands are known. U.S. Pat. Nos. 1,805,649 to Werimine, 1,971,300 to Garrett and 2,847,175 to Farley et al. are examples of tree stands.

However, applicant is unaware of any tree stand which is associated with switch means designed to activate a programmable controller to cause selective activation of a program playing device and illumination means.

SUMMARY OF THE INVENTION

The present invention relates to a programmable tree stand. The inventive tree stand includes the following interrelated aspects and features:

(a) In a first aspect, the present invention comprises a tree stand having a base with a central opening and clamping means including threaded fastening means designed to clamp the trunk of a Christmas tree in the central opening.

(b) The base includes a plurality of illumination means mounted thereon. Furthermore, mounted to the base is a programmable control means as well as a program playing device.

(c) Electrically connected to the programmable control means are a plurality of switches which may be placed in various locations surrounding the base and which are electrically connected to the programmable control means by virtue of respective electrical conductors.

(d) A fabric skirt may be placed over the entirety of the tree stand base and is intended also to cover the switches and their electrical conductors. Presents are placed over the respective switches and a programmable means is programmed to play a particular unique message corresponding to the recipient of each particular present and activated responsive to lifting of a particular present off its respective switch.

As such it is a first object of the present invention to provide a programmable tree stand.

It is a further object of the present invention to provide such a device including a plurality of switches each of which, when closed, activates a program playing device via a programmable control means.

It is a further object of the present invention to provide such a device including illumination means which may also be controllably activated.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
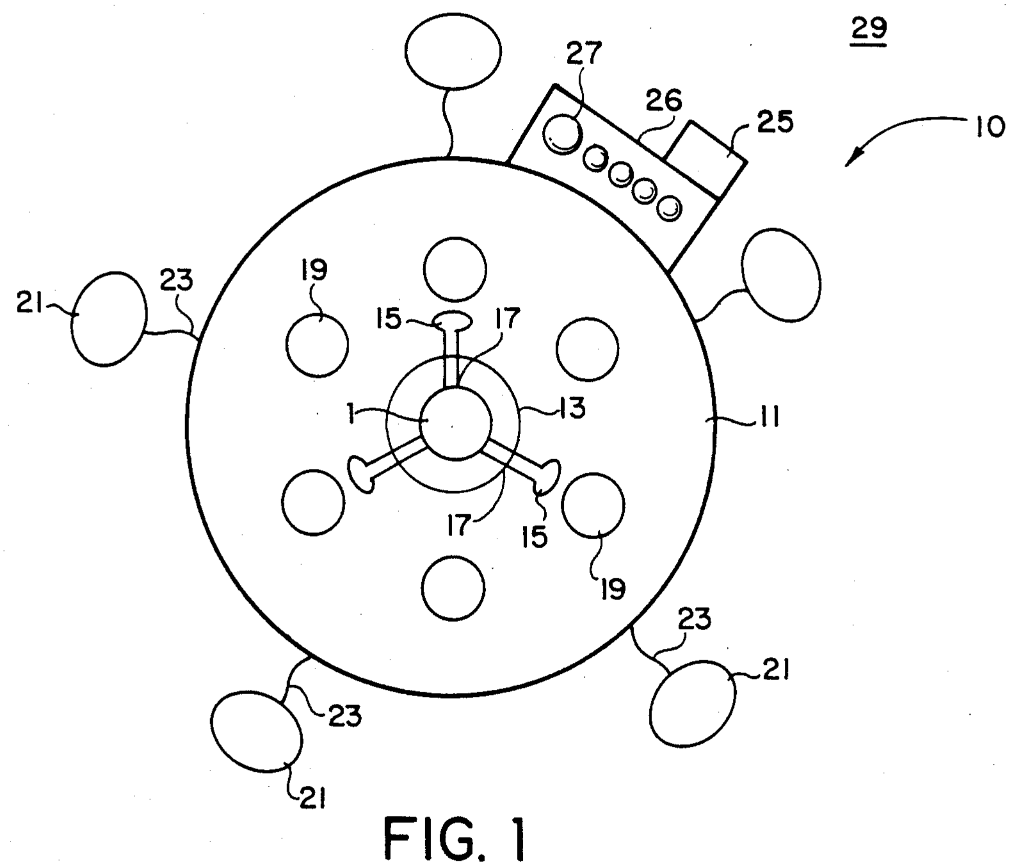
FIG. 1 shows a top view of the preferred embodiment of the present invention.

With reference, first, to FIG. 1, the inventive tree stand is generally designated by the reference numeral 10 and is seen to include a base 11 having a central opening 13 in which may be inserted the trunk of a Christmas tree 1. In surrounding relation to the opening 13, a plurality of fasteners such as threaded fasteners 15 are threadably inserted through openings 17 in the wall of the opening 13.

The base 11 has a plurality of illumination means 19 incorporated therewith for a purpose to be described in greater detail hereinafter. Furthermore, in surrounding relation to the base 11, a multiplicity of switch means 21 are provided each of which has its own electrical conductor 23, with these conductors 23 being connected into an electrical circuit to be described in greater detail hereinafter.

Also mounted on the base 11 is a programmable control means 25 which has incorporated therewith a program playing device 26 having a speaker 27. A skirt 29 is placed over the base 11, switches 21 and electrical conductors 23 and also covers the programmable control means 25 and program playing device 26.

Figure 2:
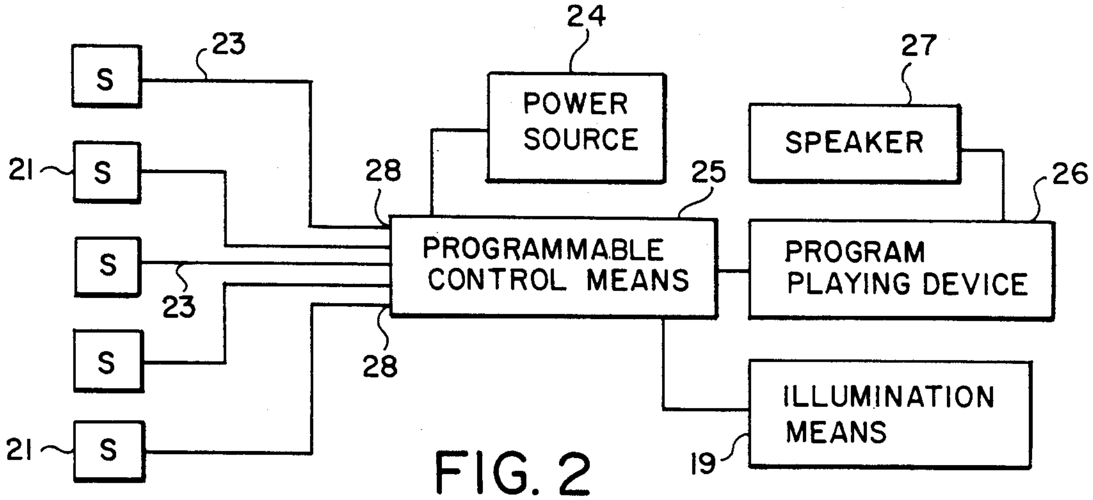
FIG. 2 shows a schematic representation of the electrical circuitry of the present invention.

With reference, now, to FIG. 2, a schematic representation of the electrical circuitry of the present invention is depicted.

The circuit includes a programmable control means 25 which may be a computer or other data processing means. A power source 24 which may be a battery pack or other source of alternating or direct current provides power to the programmable means 25.

The programmable control means 25 is electrically connected to the program playing device 26 as well as to the illumination means 19.

The switches 21 are each individually electrically connected to the programmable control means 25 by virtue of respective electrical conductors 23. Connection receptacles 28 on the programmable means 25 are provided in sufficient number to accommodate the switches 21 as well as any additional switches which may later be added to the system as desired.

In the intended use of the present invention, the switches 21 are concealed under the skirt 29 as shown in FIG. 1. A present is placed over each switch 21. The switches 21 are designed to open their circuit responsive to sensing of a weight placed thereover, such as the weight of a present. The switches 21 are designed to close the circuit when the present is removed therefrom.

The user of the system places particular presents on particular switches and programs the programmable control means to activate a distinct unique program in the program playing device 26 responsive to the closing of a particular switch 21.

In further explanation, if a particular present is to be given to a person named Alice, this present is placed on one of the switches 21. The programmable control means 25 is programmed based upon having plugged in the particular conductor 23 into the respective socket 28 so that when a subcircuit including the particular switch 21 on which the present for Alice has been placed is closed, the programmable control means 25 will send a control signal to the program playing device 26 ordering the program playing device 26 to play a message which has been particularly prerecorded or precreated for Alice. Thus, when Alice lifts her present off the switch 21, the program playing device will be activated to play a message such as, for example, "Merry Christmas Alice" or "This present is for you, Alice" or any other suitable message. In this way, when each present recipient lifts their present off the respective switch 21, a message will be played for that particular recipient which is completely personalized.

The program playing device may be of a type which plays magnetic tape, of the video or audio type, a phonograph record and/or a laser disk. Of course, if desired, the program which is played responsive to a particular recipient lifting their present off a particular switch may, instead comprise a favorite song of the recipient.

The programmable control means may be preprogrammed in any desired manner. For example, a keyboard (not shown) may be connectable to the programmable control means to pre-program the various subcircuits thereof. Any suitable manner of programming of the programmable control means 25 may be suitably employed.

As such, an invention has been disclosed in terms of a preferred embodiment thereof which fulfills each and every one of the objects of the invention set forth hereinabove and provides an new and improved programmable tree stand of great novelty and utility.

Of course, various changes, modifications and alterations in the teachings of the present invention may be contemplated by those skilled in the art without departing from the intended spirit and scope thereof. As such, it is intended that the present invention only be limited by the terms of the appended claims.

I claim:

1. In a tree stand including a base and means for supporting a tree thereon, the improvement comprising:
   (a) a programmable control means;
   (b) a program playing device electrically connected to said programmable control means;
   (c) a plurality of switches electrically connected to said programmable control means;
   (d) said switches being placeable adjacent said base;
   (e) said program playing device having at least one program;
   (f) at least one of said switches being biased to a normally closed position and openable responsive to placement thereon of a weight, whereby with said weight placed on said at least one of said switches and said at least one of said switches being in an open position, removal of said weight causes closure of said at least one of said switches causing said programmable control means to activate said program playing device to play said at least one program.

2. The invention of claim 1, wherein said program playing device has a plurality of programs corresponding in number to the number of said switches.

3. The invention of claim 1, further including illumination means activated upon closing of a said switch.

4. The invention of claim 2, wherein said program playing device has a speaker.

5. The invention of claim 2, wherein said at least one of said switches comprises each of said switches.

6. The invention of claim 5, wherein said weight comprises a present.

7. The invention of claim 6, further comprising one present for each of said switches, each of said plurality of programs corresponding to a respective recipient of a said present.

* * * * *